3,245,884
PROCESS FOR THE PURIFICATION OF POLYETHYLENE GLYCOLS

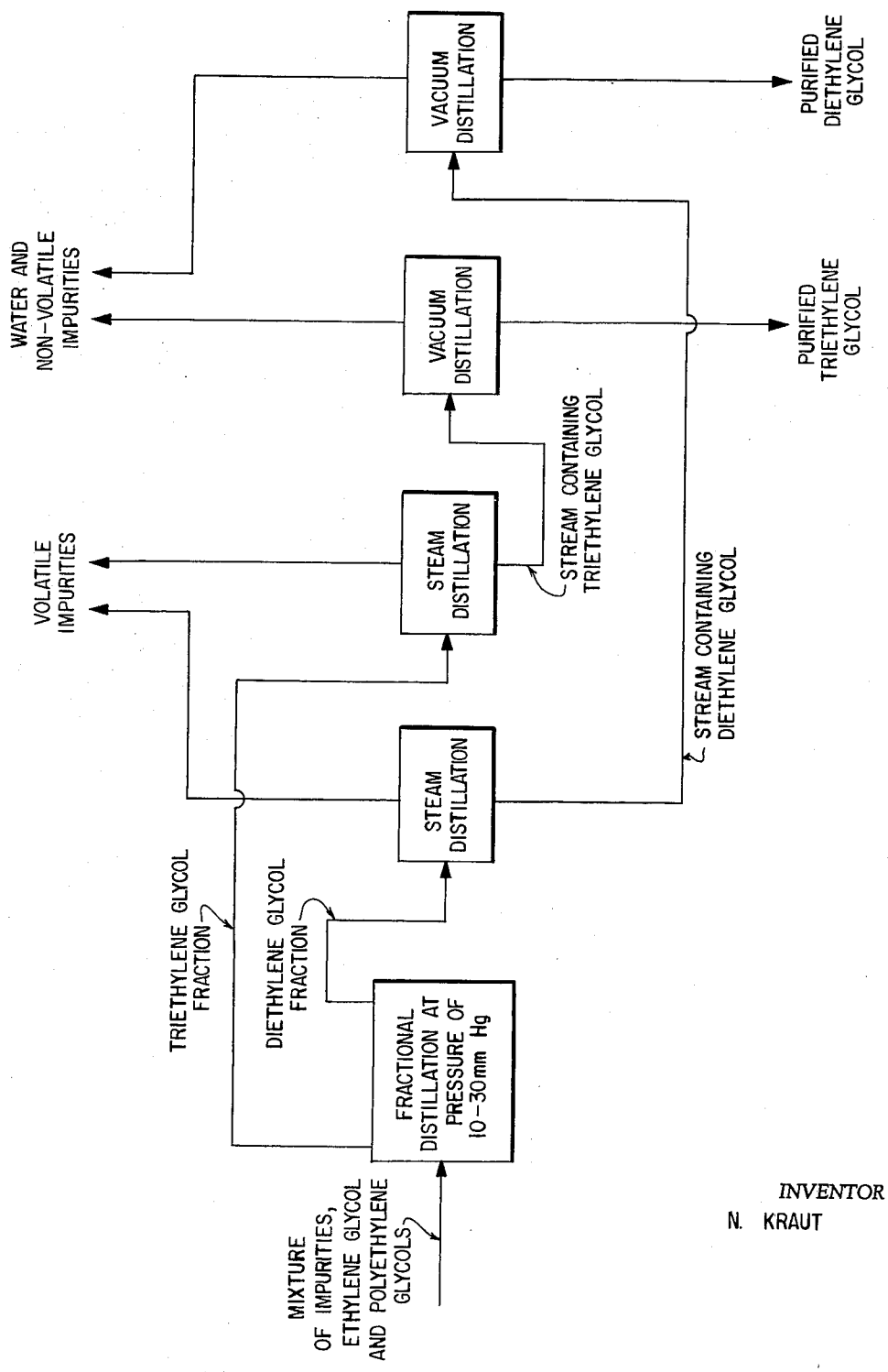

Nicholas Kraut, Ottawa, Ontario, Canada, assignor to Union Carbide Canada Limited, Toronto, Ontario, Canada, a corporation of Canada
Filed Dec. 28, 1961, Ser. No. 162,922
5 Claims. (Cl. 203—76)

This invention relates to a process for the removal of colored impurities from diethylene glycol and from triethylene glycol. More particularly, this invention relates to a process for the purification and recovery of diethylene glycol and triethylene glycol from a mixture containing these glycols.

One of the major sources of diethylene glycol and of triethylene glycol is the by-product formed during the manufacture of ethylene glycol. In the final stages of its manufacture, ethylene glycol is separated from a mixture containing, in addition to the ethylene glycol, colored impurities, diethylene glycol and triethylene glycol, by a distillation operation in which the ethylene glycol is recovered as a distillate. During the distillation operation, however, the concentration of colored impurities in the distilland increases to such an extent, due to such side reactions as decomposition, oxidation, condensation, polymerization and charring of materials which are present therein, that on recovering diethylene glycol and triethylene glycol from the distilland they do not meet their commercial color specifications. Consequently, such glycols find little if any use in such applications as intermediates in the manufacture of polyethylene glycols, polyester resins and the like.

Attempts to remove colored impurities from diethylene glycol and from triethylene glycol, as for example by distillation, have not been successful since the impurities co-distill with the diethylene glycol and the triethylene glycol. Removal of colored impurities from diethylene glycol and from triethylene glycol has also been attempted by the use of adsorbents such as activated charcoal and activated alumina which are intended to adsorb the impurities. The use of adsorbents, however, has been found to be ineffectual as the diethylene glycol and the triethylene glycol recovered have still failed to meet commercial color specifications.

Acceptable commercial color specifications for diethylene glycol are less than about 15 on the platinum-cobalt color scale. Acceptable commercial color specifications for triethylene glycol are less than about 25 on the platinum-cobalt color scale. The platinum-cobalt color scale is described in "Standard Methods for the Examination of Water Sewage," 9th edition (1946), pages 14–15, published jointly by the American Public Health Commission and by the American Water Works Association.

The present invention provides for the purification and recovery of diethylene glycol and/or of triethylene glycol from a mixture containing at least one polyethylene glycol of the formula:

(Formula I)

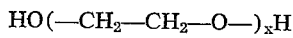
HO(—CH$_2$—CH$_2$—O—)$_x$H wherein $x$ has a value of 2 to 3 inclusive with the result that the diethylene glycol and/or triethylene glycol recovered have commercially acceptable color specifications.

The drawing is a flow sheet illustrating the steps of the process.

In accordance with one aspect of this invention, a mixture containing colored impurities, ethylene glycol and at least one of the polyethylene glycols coming within the purview of Formula I is fractionally distilled and the diethylene glycol and/or triethylene glycol fraction recovered. Each fraction recovered is then treated with steam to remove the colored impurities by steam distilling the volatile impurities. Some of the impurities are transformed into non-volatile condensation products. The fractions are then distilled under reduced pressure to separate the diethylene glycol or triethylene glycol from the non-volatiles and to yield diethylene glycol or triethylene glycol meeting acceptable color specifications. When the color of the crude poly ethylene mixture is less than 100 on the platium-cobalt scale, the initial distillation may be omitted.

In conducting that aspect of the present invention wherein a mixture containing colored impurities, ethylene glycol and either diethylene glycol or triethylene glycol or both is first fractionally distilled and each fraction recovered, treated with steam and redistilled, the fractional distillation is carried out under an absolute pressure of about 10 mm. of Hg to about 30 mm. of Hg and preferably about 20 mm. of Hg. At pressures within the range noted, the diethylene glycol fraction is collected at a temperature of about 120° C. to about 166° C., the triethylene glycol fraction is collected at a temperature of about 166° C. to about 167° C., and the temperature at which the fractional distillation is conducted does not exceed about 185° C. As a result of maintaining the temperature not in excess of about 185° C., formation of colored impurities, due to side reactions of the type previously described, is kept to a minimum.

Steam treatment of each polyethylene glycol fraction recovered from the fractional distillation step is carried out by simply passing steam, generally under pressure, through each recovered fraction until the volatile impurities have been removed and other impurities have been condensed to yield non-volatiles. The amount of steam used and also the rate at which it is passed through each fraction will of course vary in each instance and depend, in part, upon the amount and type of each polyethylene glycol fraction. As a practical matter the amount of steam used is from about 0.1 pound to about 10 pounds and preferably from about 3 pounds to about 5 pounds per pound of polyethylene glycol fraction. Before the steam treatment it is desirable to adjust the pH of the mixture to about 7. When the pH is much above 7 violent decomposition may occur upon distillation.

In order to insure that each fraction which has been steam treated is substantially free of water and non-volatiles formed during the steam treatment, it is customary to subject such fractions to a subsequent distillation thereby separating any water or non-volatiles from the product.

In those instances wherein a mixture containing colored impurities, ethylene glycol and either diethylene glycol or triethylene glycol or both, has a color rating on the platinum-cobalt color scale of less than about 100, the mixture, if desired, can be first steam-treated and then fractionally distilled in a manner as previously described.

The following example further illustrates the present invention and is not intended to limit the scope thereof in any manner.

Example 1

A mixture, having a pH of 7 and containing 6 parts by weight of ethylene glycol, 48 parts by weight of diethylene glycol, 38 parts by weight of triethylene glycol and 8 parts by weight of residue was fractionally distilled using a distillation column which was packed with glass helices to a height of 90 centimeters. The fractional distillation was conducted under an absolute pressure of 20 mm. of Hg. The diethylene glycol fraction collected at a temperature of about 120° C. to about 166° C. and with the triethylene glycol fraction collected at a temperature of about 166° C. to about 167° C.

Each fraction recovered was then heated to a temperature of about 105° C. to about 110° C. and then treated with steam for 5 hours using from about 3 to about 5 pounds of steam, per pound of polyethylene glycol fraction. In each instance the steam was under a pressure of 30 p.s.i.g. This steam treatment steam-distilled volatile yellow oily impurities from the fraction while the non-volatile impurities remained. The fractions were then vacuum distilled through a packed column at an absolute pressure of 20 mm. of mercury.

The diethylene glycol recovered had a color rating of 5 on the platinum-cobalt color scale.

The triethylene glycol recovered had a color rating of 20 on the platinum-cobalt color scale.

While the process herein described has been discussed with reference to mixtures of polyethylene glycols obtained as a by-product in the production of ethylene glycol, it is not limited to polyethylene glycol mixtures obtained in this manner. The process of this invention can be used with equal success to separate pure diethylene glycol and triethylene glycol from other polyethylene glycol mixtures containing colored impurities together with diethylene glycol and triethylene glycol.

What is claimed is:

1. Process of purifying polyethylene glycols which comprises fractionally distilling a mixture containing colored impurities, ethylene glycol and at least one polyethylene glycol of the formula:

$$HO(-CH_2-CH_2-O)_xH$$

where $x$ has a value of 2 to 3 inclusive under a pressure of from 10 mm. of Hg to about 30 mm. of Hg, recovering as distillate fraction each of said polyethylene glycols and subjecting each recovered fraction to the sequential steps of steam distilling the fraction to remove volatile impurities and subsequently vacuum distilling from the fraction the water and non-volatile impurities formed during the steam distillation whereby glycols having a commercially acceptable color specification are produced.

2. Process as defined in claim 1 wherein the said mixture contains colored impurities, ethylene glycol, diethylene glycol and triethylene glycol.

3. Process as defined in claim 1 wherein the said fractional distillation is conducted at a pressure of about 20 mm. of Hg.

4. Process as defined in claim 1 wherein the amount of steam used in steam treating each recovered fraction is about 0.1 pounds to about 10 pounds per pound of said fraction.

5. Process as defined in claim 1 wherein the amount of steam used in steam treating each recovered fraction is about 3 pounds to about 5 pounds per pound of said fraction.

References Cited by the Examiner

UNITED STATES PATENTS

| | | | |
|---|---|---|---|
| 700,181 | 5/1902 | Douillet | 202—46 X |
| 1,903,472 | 4/1933 | Oehme | 260—637 |
| 2,368,669 | 2/1945 | Lee et al. | 202—46 |

FOREIGN PATENTS

| | | |
|---|---|---|
| 794,808 | 5/1958 | Great Britain. |
| 801,723 | 9/1958 | Great Britain. |

OTHER REFERENCES

Weissberger: Distillation, Interscience Publishers, Inc., New York, 1951, Q. D. 251 W 44 C.2, pages 17 and 377.

NORMAN YUDKOFF, *Primary Examiner.*

GEORGE D. MITCHELL, *Examiner.*

M. SILVERSTEIN, *Assistant Examiner.*